United States Patent
Wang et al.

(10) Patent No.: US 8,416,767 B2
(45) Date of Patent: Apr. 9, 2013

(54) COMMUNICATION MODE SWAPPING FOR TELECOMMUNICATIONS DEVICES

(75) Inventors: Winston Wang, Seattle, WA (US); Robert Buck, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 805 days.

(21) Appl. No.: 12/498,247

(22) Filed: Jul. 6, 2009

(65) Prior Publication Data

US 2011/0003585 A1    Jan. 6, 2011

(51) Int. Cl.
*H04L 12/66* (2006.01)

(52) U.S. Cl.
USPC .......................................................... 370/352

(58) Field of Classification Search .................. 370/401, 370/352, 260, 338; 709/227; 455/556.1
See application file for complete search history.

(56) References Cited

U.S. PATENT DOCUMENTS

| | | | |
|---|---|---|---|
| 6,374,259 B1 | 4/2002 | Celik | |
| 6,654,768 B2 | 11/2003 | Celik | |
| 7,296,036 B2 | 11/2007 | Celik | |
| 7,349,907 B2 | 3/2008 | Celik | |
| 7,447,510 B2 | 11/2008 | Celik et al. | |
| 7,509,349 B2 | 3/2009 | Celik | |
| 7,643,470 B2 * | 1/2010 | Herledan et al. | 370/352 |
| 7,688,760 B2 * | 3/2010 | Xu et al. | 370/255 |
| 8,032,547 B2 * | 10/2011 | Willey | 707/770 |
| 2003/0058806 A1 | 3/2003 | Meyerson et al. | |
| 2004/0203664 A1 | 10/2004 | Lei et al. | |
| 2006/0026214 A1 | 2/2006 | Berg et al. | |
| 2007/0217366 A1 | 9/2007 | Sagi et al. | |
| 2009/0042600 A1 | 2/2009 | Zaus | |
| 2009/0209240 A1 | 8/2009 | Mahowald | |

FOREIGN PATENT DOCUMENTS

| | | |
|---|---|---|
| EP | 1703699 A2 | 9/2006 |
| WO | WO03067832 A1 | 8/2003 |
| WO | WO2008045811 A2 | 4/2008 |

OTHER PUBLICATIONS

3GPP TS 23.172 v5.0.0 (Jun. 2002) Technical Specification, "3rd Generation Partnership Project; Technical Specification Group Core Network;Technical realization of Circuit Switched (CS) multimedia service UDI/RDI fallback and service modification; Stage 2," (Release 5), retrieved at <<http://www.3gpp.org/>> on Mar. 3, 2009, 17 pages.

Auchard, "Yahoo Mail lets e-mailers text-message to phones," Reuters, Thomson Reuters 2008, Aug. 27, 2007, 2 pages.

"Chatting With Your Contacts: Switching Between Email and Chat," Yahoo! Mail Tutorials, retreived at <<http://help.yahoo.com/tutorials/cg/mail/cg_chat5.html>> on Feb. 28, 2009, 5 pages.

(Continued)

*Primary Examiner* — Chandrahas Patel
(74) *Attorney, Agent, or Firm* — Lee & Hayes, PLLC (57) ABSTRACT

Techniques for switching between communication modes on a telecommunications device are described. A telecommunications device creates a logical communication session between itself and another device. The logical communication session accommodates multiple communication modes and multiple communication protocols. The techniques described in this disclosure provide for ways to transition a communication from one communication mode to another communication mode with minimal user input and minimal connection delay.

23 Claims, 6 Drawing Sheets

OTHER PUBLICATIONS

Ma et al, "Enhancing Multi-Channel Mobile Internet User Experience," retrieved at <<http://www2002.org/CDROM/poster/84/>> on Feb. 28, 2009, 7 pages.

Joisten et al, "CMC-Mashups: Convergence of Voice, Text and other Data in Conversations on PCs and Mobiles Phones," Mobile Multimedia—Content Creation and Use Workshop at MobileHC1 2008, Sep. 2-5, 2008, Amsterdam, The Netherlands, 3 pages.

Overview of 3GPP Release 7 V09.4 (Jan. 2009), retreived at <<http://www.3gpp.org>> on Mar. 3, 2009, 141 pages.

The PCT International Search Report mailed Mar. 2, 2011 for PCT Application No. PCT/US2010/040721, a counterpart foreign application of U.S. Appl. No. 12/498,247.

* cited by examiner

COMMUNICATION MODE SWAPPING FOR TELECOMMUNICATIONS DEVICES

BACKGROUND

Over the past thirty years, telephony has significantly evolved from the once-ubiquitous public switched telephone service (PSTN). Telecommunications consumers today have a wide range of telecommunications options to choose from, including traditional landline phone service, IP-based telecommunications services (based on, for example, Voice over Internet Protocol), cellular telecommunications services, and converged telecommunications services (such as Unlicensed Mobile Access or UMA).

Telecommunications devices now consist in a myriad of form factors, such as traditional landline phones, cordless phones, cellular phones, smart phones, PDA phones, desktop and portable computers, media players, home telecommunications hubs, or the like (hereinafter "telecommunications devices"), which have become a ubiquitous part of modern life. Originally, most of these telecommunications devices just provided two-way voice communication between a first person at a first location using a first telecommunication device and a second person at a second location using a second telecommunication device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunication devices are frequently capable of both voice and data communications, using various modes of such communications. Email, text messages (e.g., Short Message Service or SMS), and multimedia messages (e.g., Multimedia Messaging Service or MMS) are well-known forms of asynchronous data communications. Email was originally used with computers, but is now commonly sent and received through telecommunications devices as well. SMS text messaging has been used for many years in the area of cellular telecommunications. Participants are typically engaged in the communications at different times, and their participation might occur as a number of small, non-contiguous, asynchronous interactions.

In addition to person-to-person communications, many modern telecommunications devices are capable of other types of data communications through access to the Internet and other databases. For example, many telecommunication devices have built-in web browsers for Internet navigation.

Voicemail is another voice communications mode, in which a caller leaves a recorded message for a recipient. The recipient listens and responds to a voicemail message at his or her leisure. Because of the time lag between leaving the message and actually listening or responding to the message, this communications mode is referred to as asynchronous.

It should be noted that both voice and data communications might be implemented using the same wireless and IP-based technologies. In some situations, particularly with conventional cellular or IP-based systems, voice might be communicated using a proprietary cellular protocol, while data and non-voice communications are based on other protocols carried over a cellular and/or an IP-based telecommunications network.

Telecommunications devices vary in complexity and capabilities, from simple devices that support only voice communications, to very sophisticated devices with capabilities of personal computers. Higher-end telecommunication devices are identified to include smart phones but increasingly include desktop and portable computers. These include telecommunication devices that typically have an operating system executed from some form of solid-state memory by one or more processors.

It would be advantageous to enhance the usability of telecommunications devices, particularly with respect to the multiple communication modes currently available. Improving usability of telecommunications devices is challenging given the form factor limitations inherent in a mobile device and the limitations of networks currently in place for delivering signals to telecommunications devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to systems and methods for enabling one or more users of telecommunications devices to switch between communication modes on a telecommunications device.

Telecommunications devices offer multiple modes of communication and are capable of communicating with multiple types of recipient devices. For instance, a user of a telecommunications device may communicate with a user of another telecommunications device by voice, video with voice, text messages (e.g., Short Message Service or SMS messages), multimedia messages including audio, images or video (e.g., Multimedia Message Service or MMS), email, instant messaging, etc. In other instances the user of the telecommunications device may communicate with a user of a device having fewer modes of communication such as a landline phone capable only of voice communication or a text pager capable of only text messaging and email. In instances where the telecommunications device and a recipient device share at least two modes of communication it is possible for the users of the respective devices to switch between modes of communication.

A "conversation" as used herein is a connected flow or sequence of discrete or continuous communications between telecommunications devices regardless of the mode of the communications. Generally, a conversation is between two or more participants. In most cases, a conversation is initiated by one of the participants, and ends when all participants remove themselves from the conversation. However, a conversation can also be initiated programmatically between participants. In addition, participants can often be added or removed during the conversation.

The systems and methods described in this disclosure provide ways for users to transition between communication modes. Seamless transitions between communication modes allow users to easily continue a conversation in different communication modes with a minimum of user input.

Seamless transitions are enabled by creating a logical communication session between telecommunications devices. The logical communication session is an aggregation of multiple communication modes, each potentially communicating with multiple communication protocols and communicating over multiple networks. Once a logical communication session is established, seamless transition between any of the communication modes within that logical communication session becomes possible. Creation of the logical communication session may involve software on telecommunication devices that present a user interface which groups disparate communication modes together so that users perceive seamless switching between communication modes.

The systems and methods described herein may be implemented in a number of ways. Example implementations are provided below with reference to the following figures.

Example Network Architecture

Figure 1:
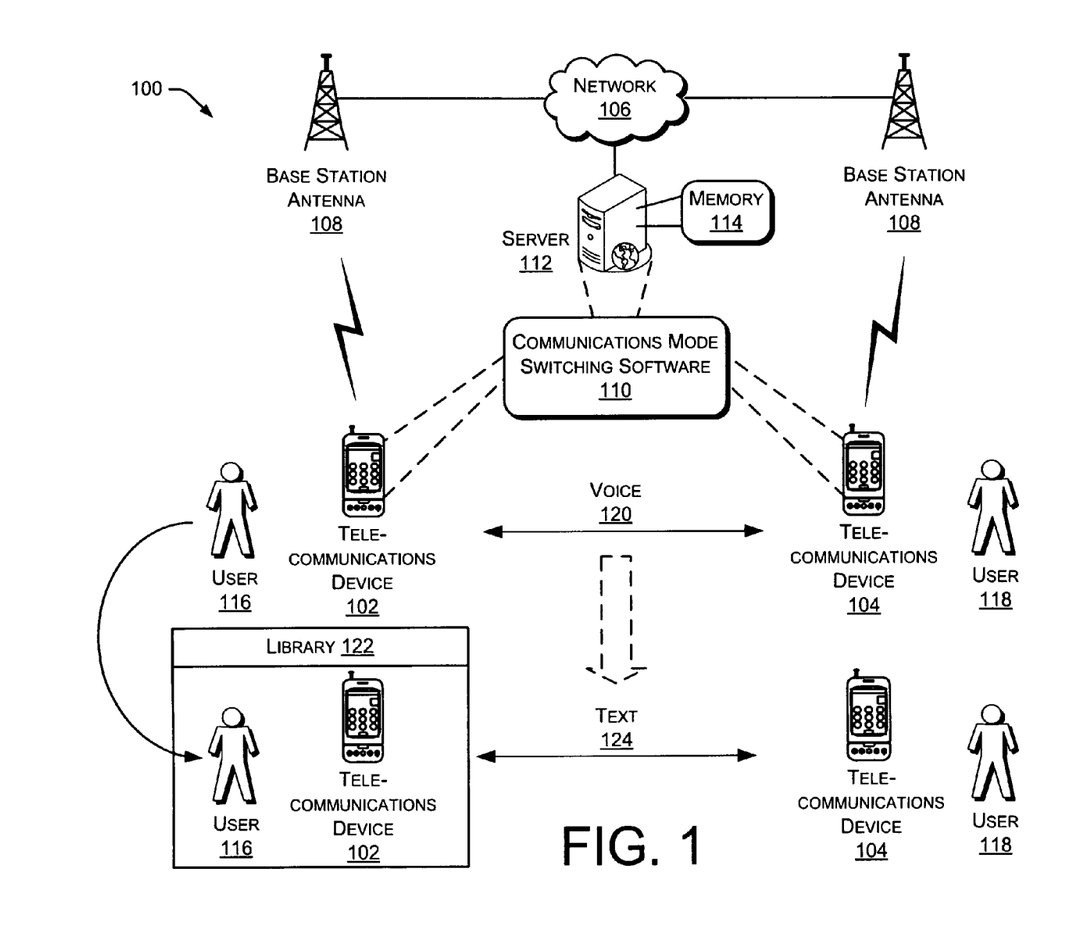
FIG. 1 illustrates an example architecture in which a telecommunications device switches between communication modes.

FIG. 1 illustrates an exemplary architecture 100 for implementing communication mode switching on telecommunications devices. The exemplary architecture 100 shows, telecommunications devices 102, 104. Telecommunications devices 102, 104 are capable of connecting to one or more networks, as represented by network 106.

The network 106 is representative of any one or combination of multiple different types of networks, interconnected with each other and functioning as a single large network (e.g., circuit-switched telephone networks or IP-based packet-switch networks). The network 106 may also include wire-based networks (e.g., PSTN, IP-based, etc.) and wireless networks (e.g., cellular, satellite, IP-based, etc.). In the case of wireless networks, the network 106 may be accessed by the telecommunications devices 102, 104 via a base station antenna 108 for receiving and transmitting wireless signals. The network 106 may use any number of protocols and configurations to enable the telecommunications devices 102, 104 to access other devices and resources. The network 106 may include several types of circuit-switched telephone networks, such as Public Switched Telephone Network (PSTN) and packet-switched networks, such as the Internet. For example, the network 106 may include a Global System for Mobile Communication (GSM) network, a Code Division Multiple Access (CDMA) network, an Enhanced Data Rates for GSM Evolution (EDGE) network, a Universal Mobile Telecommunications System (UMTS) network and/or other types of circuit-switched networks, a Long Term Evolution (LTE) network, the Internet, and/or other packet-switched networks. The network 106 may also include private networks such as a mobile telephone operator's networks which may use proprietary systems or protocols that are different from the systems or protocols implemented on public networks.

Each of the telecommunications devices 102, 104 may include a display with a user interface (UI) for switching between communication modes. The communication mode switching UI is implemented as part of communication mode switching software 110 that is stored and executed by the telecommunications devices 102, 104, or alternatively, as functionality served at least in part from servers 112 in the network 106. A more detailed discussion of the user interfaces is described below with reference to FIGS. 4-5.

In the implementation in which the servers 112 store and execute communication mode switching software, the software is stored in memory 114 of the servers 112. The memory 114 may include volatile memory (such as RAM), nonvolatile memory, removable memory, and/or non-removable memory, implemented in any method or technology for storage of information. Also, a processor may include onboard memory in addition to or instead of the memory 114. Some examples of computer-readable storage media which may be included in the memory, and/or processor include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information.

The architecture 100 also shows a user 116 of telecommunications device 102. Suppose that the user 116 initiates a voice communication with another user 118 of another telecommunications device 104. The user 116 begins a conversation with the other user 118 by using a "voice" communications mode 120. Subsequently, the user 116 enters a building where voice communication 120 is unavailable or undesirable (e.g., a library 122). Telecommunications device 102 switches from a voice mode of communication 120 to a text mode of communication 124. The switching may be responsive to an input from the user 116 or alternatively the telecommunications device 102 may switch communication modes automatically (e.g., due to awareness, via GPS or otherwise, that it is in a library).

The other telecommunications device 104 makes a corresponding switch to the text mode of communication 124 in order to continue the conversation. The switch of communication modes on the other telecommunications device 104 may also be automatic in response to the telecommunications device 102 switching to a text mode of communication 124, or alternatively the other telecommunications device 104 may accept an input from the other user 118 (e.g., accepting the new communication mode) before switching to the text mode of communication 124.

Telecommunications Device

Figure 2:
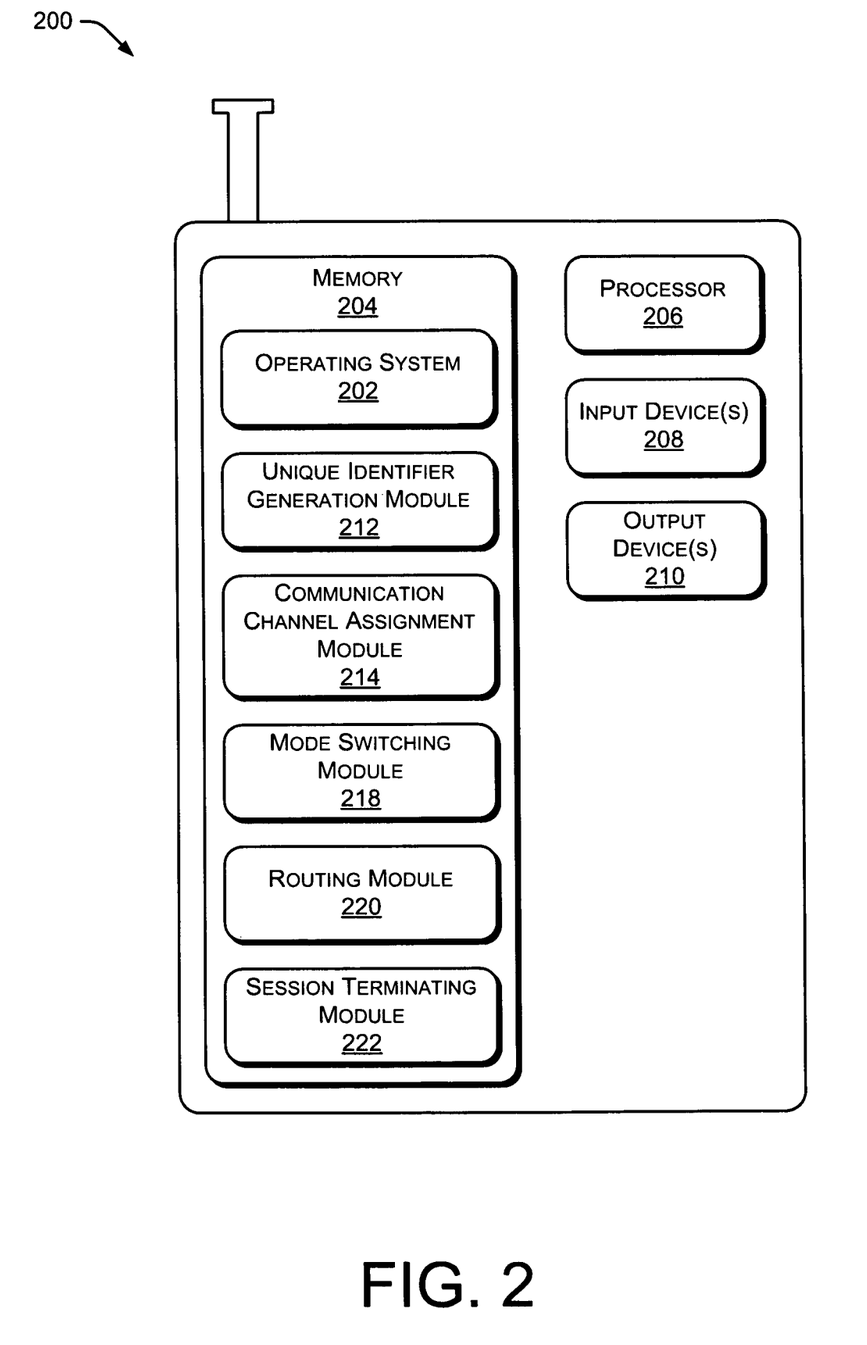
FIG. 2 is a block diagram showing various components of an illustrative telecommunications device.

FIG. 2 shows a telecommunications device 200 such as might be used in conjunction with the techniques described here. In many cases, device 200 will be what is commonly referred to as a "cell phone," although the described techniques can be used in conjunction with any telecommunications device.

Telecommunications devices are frequently capable of both voice and data communications, using various different modes of such communications. A conventional telephone call normally involves real-time, duplex, synchronous voice communications, in which all participants hear the other participants in real time, all participants can simultaneously speak, and all participants are actively engaged and respond directly and immediately to each other without significant interruption.

Email, SMS and MMS are well-known forms of non-voice asynchronous communications. Email was originally used with computers, but is now commonly sent and received through telecommunications devices, such as cell phones. SMS text messaging has been used for many years in conjunction with cell phones, and more recently MMS multimedia messaging has been introduced to facilitate transmission of multimedia content, such as audio, images and video. Users of telecommunications devices are typically engaged in asynchronous communications at different times, and their participation might occur as a number of small, non-contiguous, non-simultaneous interactions.

Note that both voice and non-voice communications might be implemented using the same wireless technologies. For example, both email and Voice over Internet Protocol (VOIP) use some of the same digital networking protocols. In other situations, particularly with conventional cellular systems, voice might be communicated using a proprietary cellular protocol, while data and non-voice communications are based on other protocols carried over the cellular network. In some implementations the selection of an appropriate network within network 106 may be made based on the communication mode (e.g. voice communication may be routed over a circuit-switched voice network and non-voice data may be routed over a packet-switched data network).

In addition to person-to-person communications, many modern telecommunications devices are capable of other types of data communications through access to the Internet and other databases. Many such devices have built-in Internet browsers for Internet navigation.

Telecommunications devices vary in complexity and capabilities, from simple devices that support only voice communications, to very sophisticated devices with capabilities approaching those of personal computers. Higher-end telecommunications devices are often identified as smart phones although increasingly are identified as desktop and portable computers, netbooks, etc.

A telecommunications device typically has an operating system 202 executed from some form of solid-state memory 204 by one or more processors 206. Custom software is preloaded onto the device to perform various functions and to support the different communication modes described above. Many telecommunications devices allow the user to customize the device through configuration options or by adding third-party software. Such software is available for many different functions, not limited to communications.

The user interfaces of telecommunications devices vary widely. The user interfaces include input devices 208 and output devices 210. The most basic input devices might consist of a numeric telephone-type keypad, to which has been added "talk" and "end" buttons for controlling voice calls, and a basic output device consisting of a single-line display for indicating telephone numbers. Other input devices 208 might include large touch-screen interfaces, alpha-numeric keypads, a microphone, and other forms of input. Output device 210 may also include display screens, speakers, and other forms of output.

In one implementation, the memory 204 of telecommunications device 200 includes modules for implementing transitions between communication modes. In other implementations, not shown, analogous modules may exist on servers 112 in the network 106. The analogous modules on servers 112 may function in place of or in conjunction with modules present in the memory 204 of the telecommunications device 200.

One such module is the unique identifier generation module 212. Each logical communication session is identified by a unique identifier generated by the unique identifier generation module 212. As one example, the unique identifier may include a unique telecommunications device indicator for the telecommunications devices participating in the communication. The unique telecommunications device indicator may be a phone number, International Mobile Subscriber Identity (IMSI) number, email address, IP address, and the like. Different types of identifiers may be used to identify the telecommunications device sending the communication and the device receiving the communication. For example, a phone number may be used to identify the telecommunications device sending the communication and an IP address may be used to identify a phone receiving the communication. Unique identifiers that are based on information other than unique telecommunications device indicators are also envisioned within the scope of this disclosure.

Frequently the same two telecommunications devices are involved in numerous separate communications with each other. For example, friends talk and message from the same two telecommunications devices several times a day but not all communications are part of the same conversation. Therefore, the unique identifier uses additional information to distinguish between separate instances of communication between these devices. This additional information is a communication instance identifier. The communication instance identifier may be derived from a timestamp (e.g., the time the communication was initiated), identifier of a network hardware item used when initiating the communication (e.g., an identifier of a base station antenna used by a mobile wireless device or the MAC address of a router used to access the Internet), or the like.

The designation of multiple communications as being part of the same conversation or alternately as part of different conversations may be indicated manually by users or automatically according to default rules. The user interface available on the telecommunications device may include a button or similar mechanism such as voice-command recognition for affirmatively indicating that a conversation is concluded. In that case, any subsequent communication becomes part of a different conversation. One example of a default rule is a time-out where, for example, after 30 minutes without communication the conversation is automatically ended. The user interface of the telecommunication devices may include a confirmation feature such as a pop-up menu whenever a conversation is to be concluded. For example, ending a voice communication by "hanging up" the phone may end the corresponding conversation or may simply end that mode of communication and the conversation to switch to a different mode of communication. In that situation a pop-up menu may present the user with a query such as "End this conversation?" or "Switch to SMS?". Additionally, following termination of a conversation there may be a mechanism for any user that participated in the conversation to revive the conversation.

Another module, which in some implementations is present in the memory 204 of telecommunications device 200, is a communication channel assignment module 214. The communication channel assignment module 214 assigns communication modes to a logical communication session. Communication modes which may be assigned to a logical communication session include, but are not limited to, real-time voice communication, instant messaging, SMS messaging, MMS messaging, email, transmission of files (either as attachments to another communication mode or as a stand-alone communication). The files may include any type of computer-readable or machine-readable file such as image files, video files, audio files, and/or executable computer programs.

Memory 204 of telecommunications device 200 may also include a mode switching module 218. The mode switching module 218 allows a user to switch between the various communication modes within the logical communication session. In some implementations the mode switching module 218 switches between communication modes automatically in response to one or more conditions reported by the telecommunications device 200 and/or the recipient device. Because the various communications modes are associated within one logical communication session it is possible for the telecommunications device 200 to switch from voice data to non-voice data without receiving further input of a recipient address from a user.

For example, the mode switching module 218 handles the transition from a real-time voice conversation to an exchange of SMS messages. The telecommunications device 200 (or the recipient device) may report limited signal strength and thus automatically switch from a communication mode that requires a strong signal (e.g. real-time voice or video transmission) to a communication mode that functions even in the presence of a limited signal (e.g., text message or email). Other examples of reported conditions that may cause the mode switching module 218 to automatically switch communication modes include network speed, network bandwidth, available encryption, geographic location (e.g. received from a global positioning system (GPS) sensor or radio frequency identification tag (RFID)), or the like.

A routing module 220 directs data corresponding to communications generated by one of the communication modes to the recipient device as indicated by the unique identifier. In implementations where the different communication modes use addresses to direct data to the recipient device, the routing module 220 correlates the disparate addresses into a single identity recognized as the recipient at the other end of the logical communication session (e.g., User 1's phone number and email address both point to User 1's telecommunications device). For example a single device (e.g., a recipient smart phone) may receive real-time voice and SMS messages addressed to a phone number, but may receive email and file attachments sent to an email address. In one implementation the routing module 220 maintains a table of addresses and corresponding communication modes for a recipient device. By referencing the table of addresses, communications to a recipient device are sent using the appropriate address. In other implementations, the recipient device responds to initiation of a communication channel by identifying its other addresses. For example during initial creation of a real-time voice connection the recipient smart phone responds by providing its email address.

In some implementations, each time a connection is made between two or more devices, addresses corresponding to all communication modes available on devices are automatically shared and updated. For example, if a user changed an e-mail address to reduce spam messages, but maintained the same voice number, the new e-mail address would be automatically transmitted to the other devices upon receiving a phone call. This will enable full switching of communication modes within a logical communication session even if all of the addresses corresponding to the communication modes are not known when the logical communication session is initiated. In other implementations less than all of the addresses may be automatically shared. For example, users may specify that automatic sharing of addresses is limited by maintaining separate address books with different access levels to the numerous communication modes, by enabling a privacy mode, or the like.

The addresses which are automatically shared may be temporary or "dummy" addresses that are valid only while the logical communication session persists. For example, a user may wish to share the e-mail address of her smart phone but desire to keep the phone number private. If a logical communication session is initiated by e-mail, transition from e-mail to voice conversation within the logical communication session may be possible by automatic sharing of a temporary phone number. Providing a temporary phone number allows the logical communication session to behave as it would if a permanent phone number were shared. However, if a participant in the logical communication session saved the temporary phone number and attempted to dial that number at a later time (after conclusion of the logical communication session), a voice connection would not be established. Provisioning of "dummy" addresses may be performed for any type or address, not just phone numbers, and the types of communication modes for which "dummy" addresses are provided may be determined explicitly by the user or by a set of predetermined rules.

Provision of an address may also include provision of relevant communication protocols, encryption methods, communication ports, or the like. Similar to the auto-swapping of addresses, analogous auto-swapping of communication protocols is possible in some implementations. For example, if a user changes from circuit-switched voice communication to packet-switched voice communication but retains the same phone number, that change in communication protocol can be sent to another device.

Another module that exists in some implementations is a session terminating module 222. As discussed above, logical communication sessions may include multiple communication modes operating on multiple communication protocols and directing data to multiple addresses. Manual termination of every communication mode within a logical communication session may be a tedious user experience. The session terminating module 222 ends a logical communication session by managing the decoupling and sign-off events for the communication modes within the logical communication session. For example, the session terminating module 222 generates the necessary commands to hang-up the phone, sign out of an instant messenger, and the like. In some implementations receiving a user input to terminate one communication mode within the logical communication sessions causes the terminating module 222 to terminate all the communication modes within that logical communication session. In other implementations a separate user input is accepted to terminate an entire logical communication session.

Logical Communication Session

As discussed above, the logical communication session enables multiple communication modes to be bundled into a single communication session. In this manner, the telecommunications devices can switch between communication modes so that users can continue a conversation spanning multiple communication modes.

Figure 3:
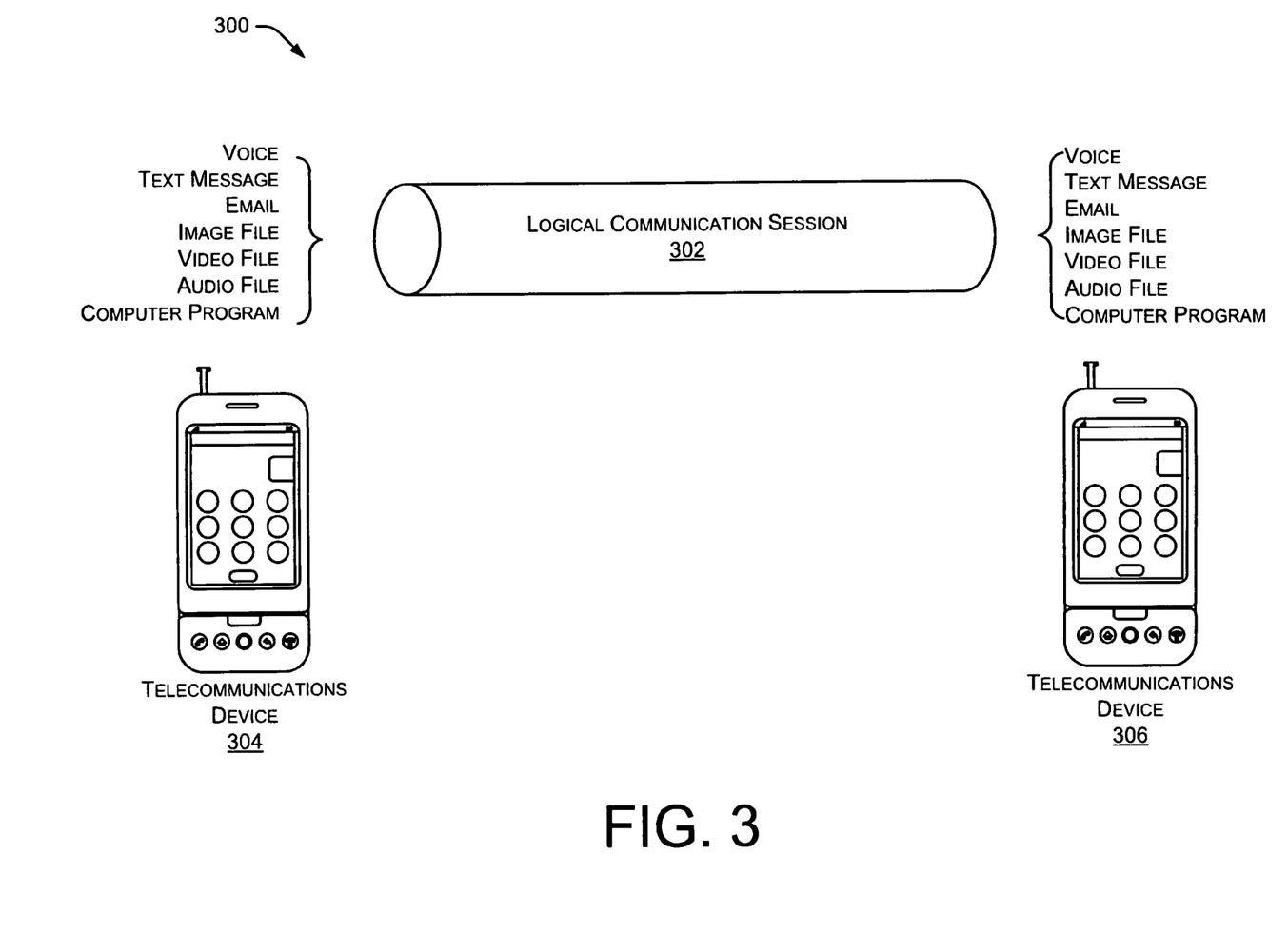
FIG. 3 illustrates a representation of a logical communication session between two telecommunications devices.

FIG. 3 shows a representation 300 of communication between two telecommunications devices 304, 306. The telecommunications devices 304, 306 may be the same or different types of devices. The communication between telecommunications device 304 and telecommunications device 306 is managed by a logical communication session 302. Multiple communication modes such as voice, text messages (including SMS messages), email, image files, video files, audio files, and computer programs are potentially included in this logical communication session 302. The logical communication session is "logical" because the communication session can include multiple communication protocols (e.g., voice and email) as well as multiple paths for transmitting and receiving data (e.g., the circuit-switch and packet-switched networks). Masking the differences between the multiple communication modes in software, hardware, user interfaces, or the like, enables users to focus on a conversation rather than managing communications modes.

In one implementation, the logical communication session 302 enables switching between communication modes by maintaining all communication modes within the logical communication session 302 in an active or a latent state. The communication mode in the active state is actively involved in sending and/or receiving communication data. The communication mode in the active state is generally the communication mode in current use. One or more communication modes may simultaneously be in an active state. The term "latent state," when applied in the context of logical communication session 302, refers a state of a communication mode that can be either manually or automatically reinitiated upon a switch to an active state. Thus, a "latent state" may be understood as state of being primed to send or receive communication data without further user input, but not actively sending or receiving. In some implementations, a latent state is created by pre-provisioning necessary resources such as by obtaining a circuit in a circuit-switched communication network. In other implementations, a latent state is created by establishing sufficient hardware, software, and communication network resources to support a change in communication mode. For example, device drivers may be loaded into memory and network routings which supply sufficient bandwidth may be identified as a part of creating a latent state. For some communication modes, in particular asynchronous communication modes, the latent state may be similar to an inactive state. For other communication modes, an inactive state may not function as a latent state because time delays imposed by software, hardware, and/or a network would be so substantial as to prevent seamless transitions from one communication mode to another.

Entering a latent state, whether through pre-provisioning or another mechanism, may be done for all communication modes every time communication is initiated over any one of the communication modes. However, in some implementations, communication modes may be placed into the latent state shortly before the communication mode is predicted to be used. For example, the prediction may be based on information provided by environmental sensors such as an accelerometer or a GPS. For example, moving a handset up and towards a user's ear may be interpreted as a signal that the user will soon switch to voice communication. Artificial intelligence, fuzzy logic, and the like may be utilized to generate the predictions.

The various communication protocols used for the communication methods within a logical communication session 302 may require the sending and receiving telecommunications devices 304, 306 (or other telecommunications devices) to engage in provisioning network services before communication data can flow between the two devices. The two devices then send several messages back and forth that enable them to agree on a communications protocol. Provisioning network services as used in this disclosure also includes other activities necessary to establish access to a network sufficient for a data connection between two devices. Provisioning network services may be initiated by transmission of data (e.g., username and password) to a remote computing device (e.g., server computer) that manages a communication method such as an instant messenger. Registration includes, in some embodiments, providing credentials for access to a network (e.g., corporate LAN) or for pay-per-use communication service (e.g., pre-paid calling card). Validation can include security and encryption related transactions involved in establishing a secure communication session and/or for providing financial information to pay for access to communication services.

Provisioning of network services for communication modes different from those in use by a telecommunications device may involve user input and a time delay. Acquiring network services during the initiation of a logical communication session rather than when a user switches communication modes allows for transitions between communication modes during a conversation. Once network services are fully provisioned, the communication methods not actively in use (i.e., latent state) are maintained so that further provisioning of network services is not necessary before sending communication data with those communication methods. In one implementation, a voice connection is opened over a phone network and maintained in an open state without transmitting voice data over the connection to another telecommunications device. In other implementations, the voice connection is maintained by sending non-voice data over the communication path typically used for voice. As an additional example, a user logged into an instant messenger service remains logged-in for the duration of the logical communication session. In some implementations the telecommunications devices 304, 306 may send heartbeat signals to keep the relevant communication paths open. In other implementations the telecommunications devices 304, 306 automatically reestablish connections by re-provisioning network services if the communication path for a communication mode is dropped. The information necessary to provision the network services (e.g., user name, password, personal identification (PIN) number, etc.) may be maintained in memory of the telecommunications device 304, 306, in remote memory such as on a network storage device, in removable storage media, or the like.

The multiple communication modes capable of being grouped into logical communication session 302 may comprise both synchronous communication modes and asynchronous communication modes. Synchronous communication involves direct communication where both parties involved in the communication are participating at the same time. Examples of synchronous communication include live-voice conversations over a telephone and instant messaging. During asynchronous, or indirect, communication both parties involved in the communication may not both be simultaneously participating during the conversation. Examples of asynchronous communication include email, SMS and MMS messaging. Switching between communication modes that are of the same type (e.g., synchronous-synchronous or asynchronous-asynchronous) may involve switching communication protocols but does not require switching between direct and indirect communication modes. However, switching between synchronous and asynchronous communication modes may not only involve switching communication protocols but may also involve switching between communication networks designed for direct and indirect communication modes.

During an active conversation, users of both telecommunications devices 304, 306 are typically interacting with their respective devices to send communications to each other. In this regard a rapid exchange of email messages may have characteristics of synchronous communication. In some implementations, one difference between synchronous and asynchronous communication is the network path used by the respective communication modes. Synchronous communications may be routed through circuit-switched networks included within network 106 shown in FIG. 1. Asynchronous communications may be routed through packet-switched networks included within network 106 of FIG. 1. Switching between synchronous and asynchronous modes of communication may involve a corresponding switch between communication networks underlying those modes of communication. The logical communication channel 302, by encompassing both synchronous and asynchronous communication modes, enables switching between communication modes that may operate with different communication protocols or even different communication networks.

Seamless switching between communication modes within a logical communication channel can be performed alone or in combination with an automatic exchange of information, in which both telecommunication devices 304, 306 automatically exchanging information (e.g., contact information) when a logical communication channel is established. As discussed above, initiation of communication over one communication mode may be accompanied by automatic exchange of address information between the telecommunication devices 304, 306. Upon one of the users requesting a switch to another mode of communication, both telecommunication devices 304, 306 may automatically launch software or establish communication protocols to switch the conversation from one communication mode to in other communication mode. Automatic exchange of conduct information may be accompanied by automatic launch of communication modes. In one implementation, receipt of an indication that another device is switching communication modes causes the recipient device to automatically accept the incoming communication and switch to the corresponding communication mode without requiring user input. In the case of transition to a voice call, for example, callers would automatically be connected (e.g., without ringing either of the devices and/or without requiring either device to accept the call).

User Interface

Figure 4:
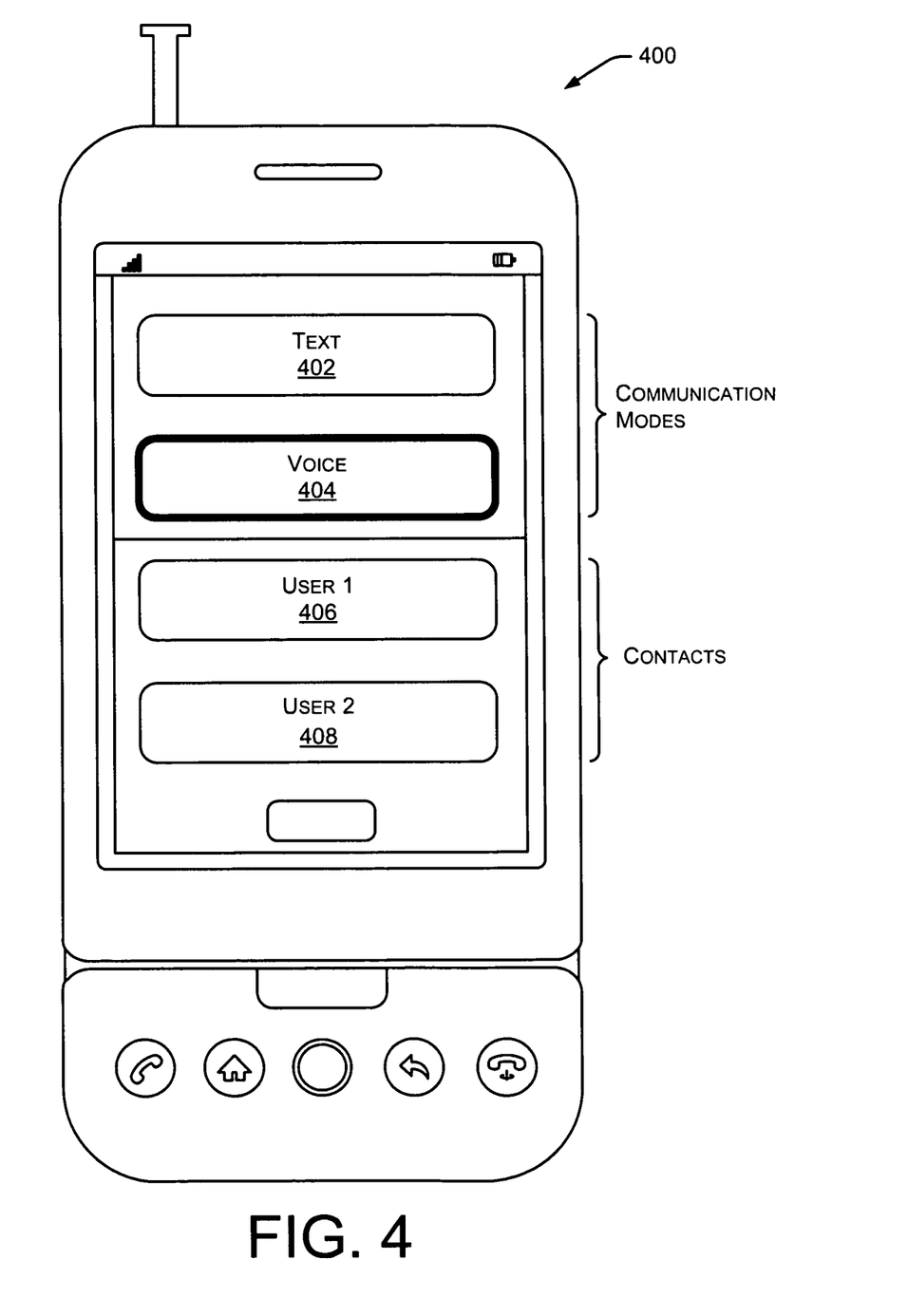
FIG. 4 is an example user interface of a telecommunications device.
Figure 5:
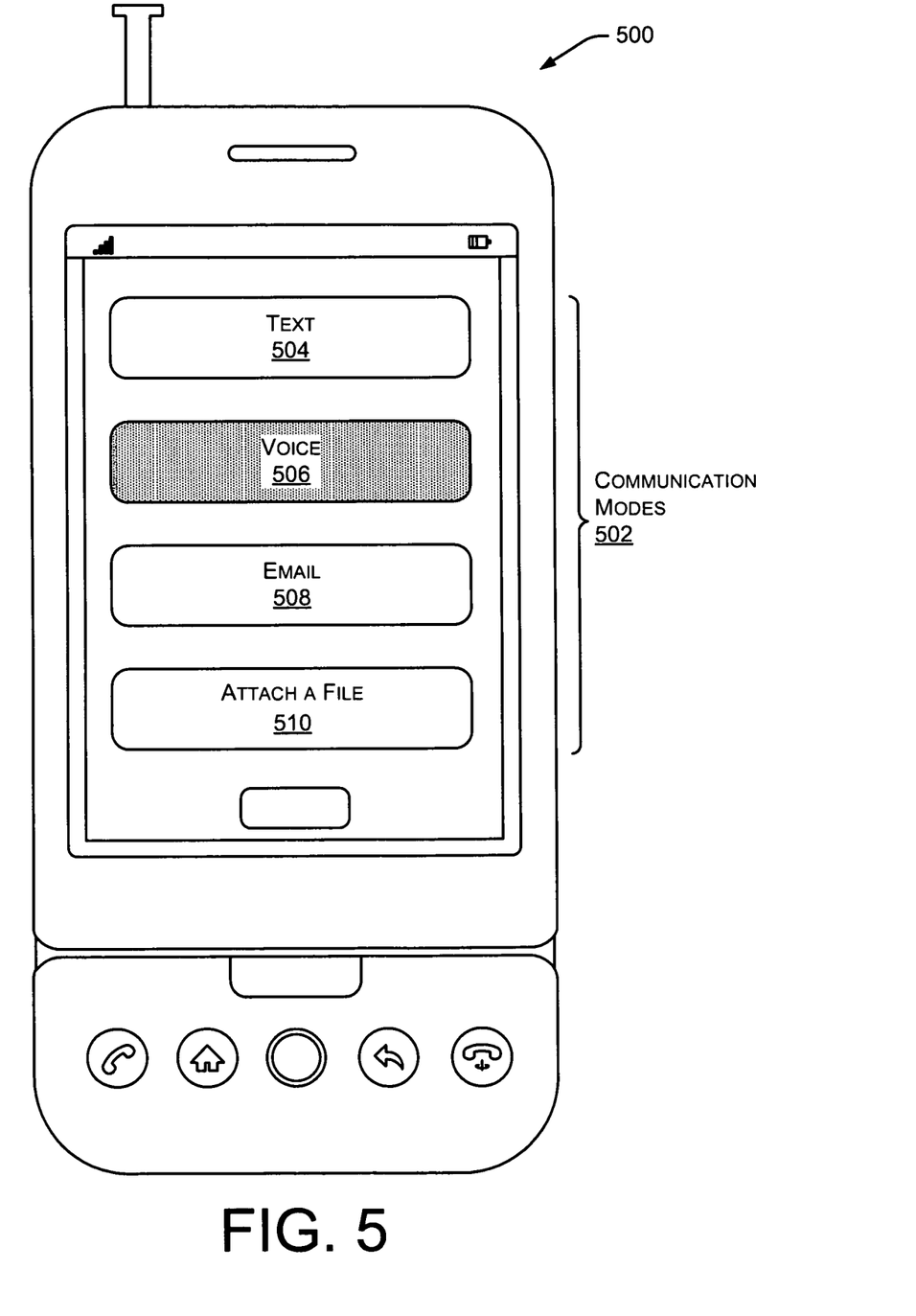
FIG. 5 is an example user interface of a telecommunications device.

FIG. 4 illustrates one example implementation of a user interface 400 for a telecommunications device. The user interface may consist of one or more buttons representing communication modes 402, 404, and/or contacts 406, 408 such as from an address book. The buttons may be mechanical buttons such as a key pad or soft buttons such as on a touch screen. The user can communicate with User 1 by selecting a button 406 and subsequently indicating a communication mode. In response to selection of a button by a user, the telecommunications device may request a logical communication session with another telecommunications device such as the logical communication session 302 shown in FIG. 3. In one implementation, selection of a contact such as User 2 408 produces a second user interface allowing selection of a communication mode that is appropriate for the selected contact such as is illustrated in FIG. 5. In another implementation, the user may first select a mode of communication and next select a recipient. For example, selection of text communication 402 may produce a second user interface allowing selection of a contact such as User 1 406 or User 2 408. If some of a user's contacts are unable able to use a given communication mode, then selection of that communication mode may produce a user interface showing only those contacts that can use the given communication mode. Following user inputs indicating a contact and a communication mode the telecommunications device requests a logical communication session from the indicated telecommunications device. In other implementations, user indication of a communication mode and a contact may be provided by voice commands rather than buttons.

Switching between communication modes may be responsive to a single user input such as a single click. During a voice conversation, a visual indication associated with the button for a voice communication 404 may indicate that voice is the current conversation mode. For example, when the text button 402 is selected the user interface 400 changes to show that text is the current conversation mode. In addition or in place of the communication mode buttons 402, 404, buttons on an alphanumeric keypad may correspond to communication modes (e.g., 1=voice, 2=text, 3=email, etc.). In other implementations the single user input may be shaking or tapping the telecommunications device, speaking a voice command (e.g., switch to streaming video), or the like. The single user input may be only one command such as selection of one button or one voice command.

FIG. 5 illustrates an example implementation of a user interface 500 for a telecommunications device which may be the same or different than the telecommunications device shown in FIG. 4. In one implementation, the user interface 500 is displayed after a contact is selected such as User 1 406 or User 2 408 as shown in FIG. 4. The user interface 500 may indicate all communication modes 502 available on the telecommunications device (e.g., text 504, voice 506, e-mail 508, attach a file 510). In other implementations, the user interface only displays the communication modes currently available on the other telecommunications device. For example, User 1 406 is selected from a list of contacts and the telecommunications device used by User 1 lacks a video conferencing communication mode a video conferencing communication mode is not displayed on the user interface 500. In some implementations if a communication mode is temporarily disabled on the other telecommunications device (e.g., User 1's mobile device is capable of voice communications, but User 1 disabled voice communication upon entering a library) the disabled communication mode 506 is shown on the user interface 500 but it is not selectable (e.g., a grayed out).

Process Scenario

Figure 6:
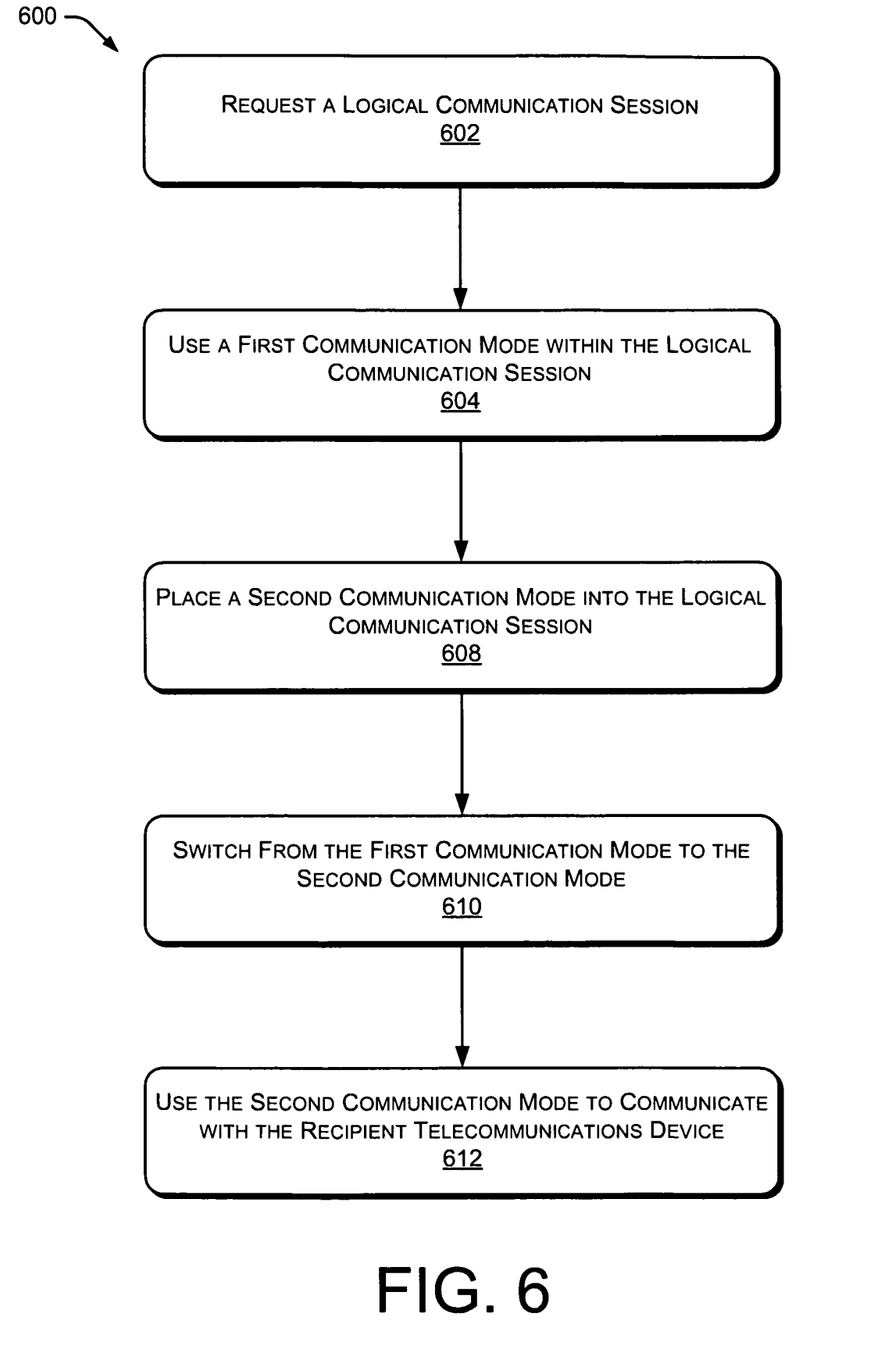
FIG. 6 is a flow diagram of a process for switching communication modes.

FIG. 6 shows a process 600 for switching communication modes on a telecommunications device. Process 600 is illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement the process. For discussion purposes, the processes are described with reference to the logical communication session 302 of FIG. 3.

At 602, the telecommunications device (e.g., a smart phone, telecommunications device 304, etc.) requests a logical communication session 302 to communicate between the telecommunications device and a recipient telecommunications device (e.g., a same or different type of device sharing communication modes with the telecommunications device). The request may be responsive to an input received from a user of the telecommunications device such as selection of a communication mode button 402, 404 or a contacts button 406, 408 as shown in FIG. 4. Depending on the configuration of the telecommunications device the input may indicate the recipient telecommunications device by entering a phone number, pushing a single speed-dial button, selecting a name from an address book, entering an email address, or similar identifier of the recipient device. In some implementations, a unique identifier for the logical communication session is created and assigned when the logical communication session is requested. In other implementations, the unique identifier is created and assigned during provisioning of network services or after establishing a logical communication session.

At 604, the telecommunications device initially uses a first communication mode within the logical communication session to communicate between itself and the recipient telecommunications device. In some implementations, the first communication mode is selected in response to an input received from the user of the telecommunications device. The first communication mode could be voice as indicated by the voice button 404 in FIG. 4. The input may directly specify the first communication mode (e.g., call User 1, email User 2, etc.) by user selection of a communication mode. Additionally or alternatively, the input may indirectly specify the communication mode by the type of recipient address entered (e.g., phone number specifies live-voice communication, email address specifies email message, etc.). In other implementations, the first communication mode is specified by the recipient device as an alternative to a communication mode requested by the telecommunications device. For example, if User 1 is in a library, his device, the recipient device, may be configured to refuse phone calls but accept SMS messages and/or voicemail. Alternatively, the recipient device may only have connectivity to a packet-switched network and be refused requests for synchronous communication modes. Regardless of how the users and devices determine a communication mode, the conversation begins with a first communication mode.

At 608, the telecommunications device places a second communication mode into the same logical communication session. In one implementation, the second communication mode is a communication mode, different than the first communication mode, shared by both the telecommunications device and the recipient device. If more than two communication modes are shared by the telecommunications device and the telecommunications device, the process may be repeated until all shared communication modes are included within the logical communication session. Alternatively, the potential communication modes available to be placed into the logical communication session may be less than all the modes shared by the two devices. For instance, the users, devices, networks, and the like may limit available communication modes (e.g., the telecommunications device automatically disables SMS messaging when inside an automobile). The user interface 500 of FIG. 5 may display disabled communication modes as buttons that are not selectable such as the voice button 506.

At 610, the telecommunications device and the recipient telecommunications device switch from the first communication mode to a second communication mode. The switching may be responsive to the user selecting only a single button such as one of the buttons 504, 506, 508, 510 shown on user interface 500 of FIG. 5. Switching communication modes places the first communication mode into a latent state and places the second communication mode into an active state. This communication mode in an active state may be shown to the user by emphasis of a button used to select the active communication mode such as the emphasis of voice button 404 in FIG. 4. The switching is seamless in that provisioning of network services, establishing mode-appropriate communication protocols, and provisioning of recipient addresses (e.g., if the second communication mode uses a different address than the first communication mode to identify the recipient telecommunications device) have already been established for the communication modes within the logical communication session. With the set-up already established, the user can switch, for example, sending voice data to a telephone number to sending non-voice data to an email address with only a single input and without entering a new address (i.e., the email address). The first communication mode is placed into a latent state, rather than terminated, so that if the users of the devices wish to switch back to the first communication mode that transition will also be seamless.

At 612, the telecommunications device and the recipient telecommunications device subsequently use the second communication mode within the logical communication session to communicate. The first and second communication modes are associated with the logical communication session by association with the unique identifier. In some implementations, the telecommunications device and the recipient telecommunications device identify the logical communication session by the same unique identifier. This unique identifier may be provided to the recipient telecommunications device while requesting a logical communication session as in step 602. Since the first communication mode and the second communication mode are both part of the same logical communication session the time and amount of user input between communication using the first communication mode and communicating using the second communication mode are reduced.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A tangible computer-readable storage device having computer-executable instructions thereon which, when executed by a computing device, implement a method or system comprising:

starting a logical communication session between a first telecommunications device and a second telecommunications device, wherein the logical communication session bundles a plurality of communication modes into a single session by associating the plurality of communication modes with a unique identifier comprising a unique telecommunications device indication and a communication instance identifier;

transmitting voice data using a synchronous communication mode within the logical communication session, wherein the voice data is associated with the logical communication session by assigning the unique identifier to the voice data;

switching from voice data to non-voice data based on an input received from at least one of the first and second telecommunications devices; and transmitting the non-voice data using an asynchronous communication mode within the logical communication session, wherein the non-voice data is associated with the logical communication session by assigning the unique identifier to the non-voice data.

2. The tangible computer-readable storage device of claim 1, wherein the non-voice data comprises one of a Short Message Service (SMS) message, Multimedia Messaging Service (MMS) messages, an email message, a image file, a video file, an audio file, or an executable computer program.

3. The tangible computer-readable storage device of claim 1, wherein the synchronous communication mode directs the voice data over a Public Switched Telephone Network (PTSN) and the asynchronous communication mode directs the non-voice data over an IP network.

4. The tangible computer-readable storage device of claim 1, wherein the synchronous communication mode is placed in a latent state when the asynchronous communication mode is in an active state and the asynchronous communication mode is placed in a latent state when the synchronous communication mode is in an active state.

5. The tangible computer-readable storage device of claim 4, wherein the latent state comprises at least one of pre-provisioning communication resources or obtaining a circuit in a circuit-switched communication network.

6. The tangible computer-readable storage device of claim 1, wherein the switching from voice data to non-voice data occurs without receiving further input of a recipient address.

7. A method implemented on a telecommunications device by a processor configured to execute instructions that, when executed by the processor, direct a first telecommunications device to perform acts comprising:
  in response to an input received from a user of the first telecommunications device indicating a second telecommunications device, requesting a logical communication session between the first telecommunications device and the second telecommunications device;
  initially using a first communication mode within the logical communication session to communicate between the first and second telecommunications devices;
  placing a second communication mode into the same logical communication session, the second communication mode being one of a voice call or video call carried by a circuit-switched network, wherein the second communication mode is set to a first latent state when added to the logical communication session;
  switching from the first communication mode to the second communication mode, wherein the switching comprises placing the first communication mode into a second latent state and placing the second communication mode into an active state; and
  subsequently using the second communication mode within the logical communication session to communicate between the first and second telecommunications devices, wherein the first and second communication modes are different.

8. The method of claim 7, wherein the logical communication session is identified by a unique identifier and the first and second communication modes are included within the logical communication session based on an association with the unique identifier.

9. The method of claim 8, wherein the unique identifier comprises a unique communication instance identifier.

10. The method of claim 7, wherein the first communication mode comprises one of real-time voice, real-time video and voice, Short Message Service (SMS), Multimedia Messaging Service (MMS) messages, email, image file transmission, video file transmission, audio file transmission, or executable computer program transmission.

11. The method of claim 7, wherein the method is performed by a telecommunications device.

12. The method of claim 7, wherein the first communication mode is asynchronous and the second communication mode is synchronous.

13. The method of claim 7, wherein the first communication mode is synchronous and the second communication mode is synchronous.

14. The method of claim 7, wherein the method is performed by one or more network servers.

15. The method of claim 7, wherein the first and second latent states each comprise a state in which a communication mode is configured to communicate with the recipient telecommunications device using a mode-appropriate communication protocol without a substantial delay.

16. A communication infrastructure that supports on-demand communication sessions between different telecommunications devices, the infrastructure being configured to perform steps comprising:
  in response to an input received from a user of a first telecommunications device, starting a logical communication session between the first telecommunications device and a second telecommunications device;
  initially selecting and using a first communication mode within the logical communication session;
  placing a second communication mode into the same logical communication session, the second communication mode being one of a voice call or video call carried by a circuit-switched network, wherein the second communication mode is set to a first latent state when added to the logical communication session;
  subsequently selecting and using the second communication mode within the same logical communication session, including setting the second communication mode to an active state and setting the first communication mode to a second latent state, wherein the first and second communications modes are associated with each other by shared placement within the logical communication session; and
  in response to an input received from the user of the first or second telecommunications device, ending the logical communication session between the first and second telecommunications devices.

17. The communications infrastructure of claim 16, wherein placing a communication mode within the logical communication session enables either the first or second telecommunications device to communicate using the communication mode without additional provisioning of network services or provisioning of a recipient address.

18. The communications infrastructure of claim 16, wherein a user interface of at least one of the first and second telecommunications devices indicates which communication modes are currently available for communicating with another telecommunications device.

19. The communications infrastructure of claim 16, wherein a unique identifier is associated with the logical communication session and the unique identifier comprises a unique telecommunications device indicator and a communication instance identifier.

20. The communications infrastructure of claim 16, wherein the first communication mode comprises one of real-time voice, real-time video with voice, Short Message Service (SMS), Multimedia Messaging Service (MMS) messages, email, image file transmission, video file transmission, audio file transmission, or executable computer program transmission.

21. The communications infrastructure of claim 16, wherein at least one of the communication modes is synchronous and at least one of the communication modes is asynchronous.

22. The communications infrastructure of claim 16, wherein a selection of at least one of the first and second communications modes is performed automatically in response to one or more conditions reported by at least one of the first and second telecommunications devices.

23. The communications infrastructure of claim 16, wherein a selection of at least one of the first and second communication modes is performed based on a single input received from at least one of the users of the first or second telecommunications devices.

* * * * *